(12) United States Patent
Jeffords

(10) Patent No.: US 12,112,232 B1
(45) Date of Patent: Oct. 8, 2024

(54) MEDIA PLAYBACK PROCESS INITIATED FROM AN ENGRAVED PLAQUE ATTACHED TO A TOMBSTONE, URN, MAUSOLEUM, OR CRYPT

(71) Applicant: Tracy Hawthorne Jeffords, Clearlake, CA (US)

(72) Inventor: Tracy Hawthorne Jeffords, Clearlake, CA (US)

( * ) Notice: Subject to any disclaimer, the term of this patent is extended or adjusted under 35 U.S.C. 154(b) by 0 days.

(21) Appl. No.: 18/664,496

(22) Filed: May 15, 2024

(51) Int. Cl.
*G06K 7/14* (2006.01)
*G06F 16/22* (2019.01)

(52) U.S. Cl.
CPC ....... *G06K 7/1417* (2013.01); *G06F 16/2291* (2019.01)

(58) Field of Classification Search
CPC .......... G06K 7/1417; G06K 16/2291
See application file for complete search history.

(56) References Cited

U.S. PATENT DOCUMENTS

2023/0023031 A1* 1/2023 Muckenfuss ....... G06F 16/9566

\* cited by examiner

*Primary Examiner* — Matthew Mikels
(74) *Attorney, Agent, or Firm* — Craig A. Simmermon

(57) ABSTRACT

Media playback process initiated from an engraved plaque attached to a tombstone, urn, mausoleum, or crypt is a special process that causes one or more media files pertaining to a deceased person or pet to play on a visitor's smart phone after the visitor has scanned a special engraved plaque or scanning code attached to the deceased person or pet's tombstone, urn, mausoleum, or crypt. The special process includes: a first person selling a subscription or one-time sale to a second person, first person building a database, first person creating a special scanning code, first person engraving the special engraved plaque or scanning code, first person attaching the special engraved plaque or scanning code to the tombstone, urn, mausoleum, or crypt, third person scanning the special engraved plaque or scanning code, and third person watching one or media files on their smart phone.

3 Claims, 4 Drawing Sheets

MEDIA PLAYBACK PROCESS INITIATED FROM AN ENGRAVED PLAQUE ATTACHED TO A TOMBSTONE, URN, MAUSOLEUM, OR CRYPT

BACKGROUND OF THE INVENTION

1. Field of the Invention

This invention relates to a special media playback process that is initiated from the scanning of a special plaque attached to a tombstone, urn, mausoleum, or crypt. A smart phone or smart device is used to scan the special plaque, which causes media to play on the smart phone or smart device. The media pertains to the deceased person marked by the tombstone, urn, mausoleum, or crypt. The process includes the engraving of a special plaque.

2. Description of Related Art

There are other media playback processes in the prior art, however, there are none that encompass all of the special procedures described below including a first person selling of a subscription service to a second person, the first person specially engraving a special plaque with a special scanning code, the first person attaching the special plaque to the tombstone, urn, mausoleum, or crypt of a deceased person or pet known by the second person, whereupon, a third person comes along to visit the deceased person or pet and scans the special code with a smart phone, and the smart phone then plays a plurality of media files pertaining to the deceased person or pet, whereupon the third person then experiences emotion. Also, the first and second persons have control over the media files with the ability to add, delete, and edit all media files. The media files being are stored on a specially created database stored on a private and secure server that is connected to the internet, wherein the first person designed and created the special database. This very complicated procedure is detailed below.

BRIEF SUMMARY OF THE INVENTION

It is an aspect of media playback process initiated from an engraved plaque attached to a tombstone, urn, mausoleum, or crypt to include the step of a first person selling a second person a subscription service or a one-time sale for the rights and means to use the media playback process.

It is an aspect of media playback process initiated from an engraved plaque attached to a tombstone, urn, mausoleum, or crypt to include the step of the first person producing a special engraved plaque that can hold up to the weather and elements and last for 50-100 years or more outside in the sun, wind, and rain.

It is an aspect of the special engraved plaque to include and engraved outside surface that is engraved with a special scanning code.

It is an aspect of the special scanning code to include engraved depression areas that are a different color than that of the outside un-engraved surface.

It is an aspect of media playback process initiated from an engraved plaque attached to a tombstone, urn, mausoleum, or crypt for the first person to attach the engraved plaque to a tombstone, urn, mausoleum, or crypt.

It is an aspect of media playback process initiated from an engraved plaque attached to a tombstone, urn, mausoleum, or crypt to alternately include the step of the first person engraving the special scanning code directly onto a tombstone.

It is an aspect of media playback process initiated from an engraved plaque attached to a tombstone, urn, mausoleum, or crypt for the first person to create a database and load it on a server.

It is an aspect of the database to include the ability to store a large number of records therein, wherein each record has the capability to store a large amount of media files therein.

It is an aspect of media playback process initiated from an engraved plaque attached to a tombstone, urn, mausoleum, or crypt for the first and second persons to have the ability to upload, delete, and edit media files on the database.

It is an aspect of media playback process initiated from an engraved plaque attached to a tombstone, urn, mausoleum, or crypt for the third person to visit a deceased person or pet associated with the second person associated with the engraved plaque attached to a tombstone, urn, mausoleum, or crypt.

It is an aspect of media playback process initiated from an engraved plaque attached to a tombstone, urn, mausoleum, or crypt for the third person to have a smart phone or smart device while visiting the deceased person or pet.

It is an aspect of media playback process initiated from an engraved plaque attached to a tombstone, urn, mausoleum, or crypt for the third person to scan the special scanning code on the special engraved plaque with their smart phone or smart device.

It is an aspect of this scanning to trigger the smart phone or smart device held by the third person to open a web browser on the smart phone or smart device and send the browser to a specific website or URL, wherein a camera function or application on the smart phone or smart device detects the special scanning code, which causes the default web browser on the smart phone or smart device to open and go to a specific website or URL, where the specific website or URL causes a plurality of media files to load and play on the web browser on the smart phone or smart device held by the third person.

It is an aspect of media playback process initiated from an engraved plaque attached to a tombstone, urn, mausoleum, or crypt for the first and second persons to have the ability to upload, delete, and edit media files on the specific website or URL and control the plurality of media files on the specific website or URL.

It is an aspect of media playback process initiated from an engraved plaque attached to a tombstone, urn, mausoleum, or crypt for the third person to watch and listen to the plurality of media files on their smart phone or smart device.

It is an aspect of media playback process initiated from an engraved plaque attached to a tombstone, urn, mausoleum, or crypt for the third person to feel emotion during the playback of the plurality of media files on their smart phone or smart device.

It is an aspect of media playback process initiated from an engraved plaque attached to a tombstone, urn, mausoleum, or crypt to replay the media files for a plurality of new or different third persons who later visit the designated deceased person or pet.

It is an aspect of media playback process initiated from an engraved plaque attached to a tombstone, urn, mausoleum, or crypt for the whole above processes to repeat with a plurality of new or different second persons associated with a new and different deceased persons or pets, wherein the first person sells a new or different second person a subscription service or a one-time sale for the rights and means to use the media playback process and so on to repeat the whole process described above.

DEFINITION LIST

Figure 1A:
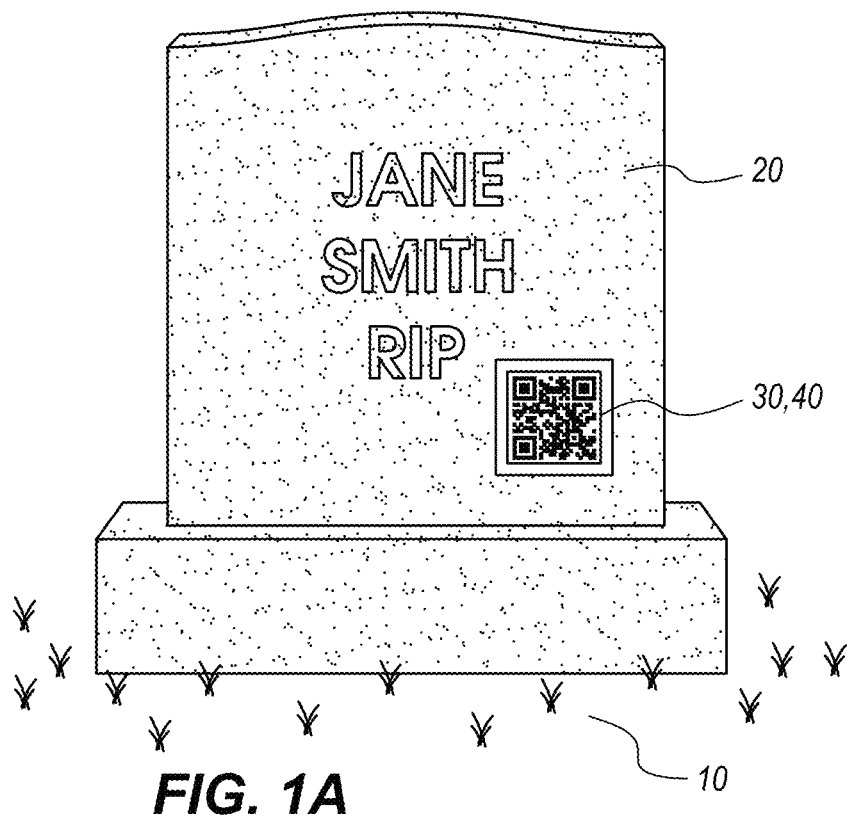
FIG. 1A is a perspective view of the final resting place for a deceased person or pet with a tombstone and a special engraved plaque attached thereto.

| Term | Definition |
| --- | --- |
| 10 | Deceased Person or Pet |
| 20 | Tombstone, Urn, Mausoleum, or Crypt |
| 30 | Plaque |
| 35 | Directly Engraved Plaque |
| 40 | Unique Scanning Code |
| 50 | First Person |
| 55 | Engraving Device or Machinery |
| 60 | Third Person |
| 70 | Smart Phone or Smart Device |
| 80 | Database |
| 90 | Server |
| 100 | Network Communications Over a Cellular Network |

DETAILED DESCRIPTION OF THE INVENTION

The modern internet age with smart phones and smart devices has changed life for all people. All aspects of life have been altered or improved by the use of smart phones or smart devices. It is a different world now. Visiting the deceased at a graveyard or mortuary should be no different. It should also include improvement of the experience by the use of smart phones or smart devices. This invention is a special process that causes one or more media files pertaining to a deceased person 10 to play on a visitor's 60 smart phone or smart device 70 after the visitor 60 has scanned a special engraved plaque 30 on the deceased person's 10 tombstone, urn, mausoleum, or crypt 20 with their smart phone or smart device 70. This invention is the intricate process shown and described below.

A first person 50 creates a database 80 with a database management system and a database model capable of storing a large quantity of data and media files. The database 80 is loaded onto a server 90. The database 80 is an organized collection of data or a type of data store based on the use of a database management system that is the software that interacts with end users, applications, and the database itself to capture and analyze the data, and additionally encompasses the core facilities provided to administer the database. The server 90 is a computer that provides information to other computers called "clients" on computer network such as the internet. The database 80 is capable of creating and storing plurality of records, wherein each record corresponds to a deceased person or pet 10. The database 80 comprises a plurality of records, wherein each record corresponds to a deceased person or pet 10. The database 80 includes the capability to store a plurality of media files pertaining to each record. The plurality of media files comprises: a plurality of photos, images, slides, caricatures, movies, videos, cartoons, films, moving pictures, drawings, paintings, diagrams, sketches, and/or graphics pertaining to the deceased person or pet 10. The server 90 is connected to the internet.

The first person 50 sells a subscription service or a one-time purchase to a second person. This subscription service or one-time purchase includes the process described here that causes the playback of media on a smart phone or smart device 70 after the smart phone or smart device 70 was used to scan a special plaque 30 attached to a tombstone, urn, mausoleum, or crypt 20. The first person 50 then creates or assigns a record in the database 80 to a deceased person or pet 10 known by the second person, wherein the deceased person or pet 10 is a loved one of the second person. The newly created or assigned record for the deceased person or pet 10 is called a new record. The database 80 comprises a plurality of records wherein each record represents a deceased person or pet 10 and each record comprises a plurality of data fields where each data field could include a media file. The second person is given internet access to the new record, wherein, the second person has the capability to upload over the internet one or more media files pertaining to the deceased person or pet 10 to the new record in the database 80. Alternately, the second person may physically deliver to the first person 50, a plurality of photos, images, slides, caricatures, movies, videos, cartoons, films, moving pictures, drawings, paintings, diagrams, sketches, and/or graphics pertaining to the deceased person or pet 10, wherein the first person 50 then scans, converts, or somehow digitizes these items to media files, and then uploads these media files to the new record in the database 80. The second person also has the capability to delete over the internet any media file in the new record in the database 80. The first person 50 also has internet access to the new record and can add and delete media files from the new record over the internet. The first person 50, the second person, or the first and second persons working together, assemble and load a plurality of media files associated with the deceased person or pet 10 to the new record on the database 80, wherein the plurality of media files associated with the deceased person or pet 10 is very pleasing and emotional to watch and/or listen to. Thus, there is a series of steps where the second person loads and/or deletes media files from the record, a series of steps where the first person 50 loads and/or deletes media files from the record, and a series of steps where the first and second persons together load and/or delete media files from the record.

Then, the first person 50 creates a unique scanning code 40 that is associated with the new record on the database 80. The unique scanning code is linked or assigned to the deceased person or pet 10. There is one scanning code 40 for each record in the database 80, where each record corresponds to one unique deceased person or pet 10. In best mode, the unique scanning code 40 is a dynamic QR code or quick-response code. A QR code is a type of two-dimensional matrix barcode that consists of black squares arranged in a square grid on a white background, including some fiducial markers, which can be read by an imaging device, such as a camera, and processed using Reed-Solomon error correction until the image can be appropriately interpreted. The required data are then extracted from patterns that are present in both the horizontal and the vertical components of the QR code. The QR code contains the data for a locator, an identifier, and for web-tracking. The unique scanning code 40 is such that, when a smart phone or smart device 70 that is connected to the internet scans the unique scanning code 40, the smart phone or smart device 70 automatically connects to the server 90 over the internet and triggers the playback of a plurality of media files associated with the deceased person or pet 10 on the smart phone or smart device 70. Most, if not all, smart phones or smart devices have software built into their camera applications, wherein this software automatically detects a QR code and then processes the QR code by opening a web browser on the smart phone or smart device 70 and connecting to the website or uniform resource locator (URL) that is programmed or embedded within the QR code. The smart phone or smart device 70 is wirelessly connected to the server 90 over a cellular network.

Figure 4:
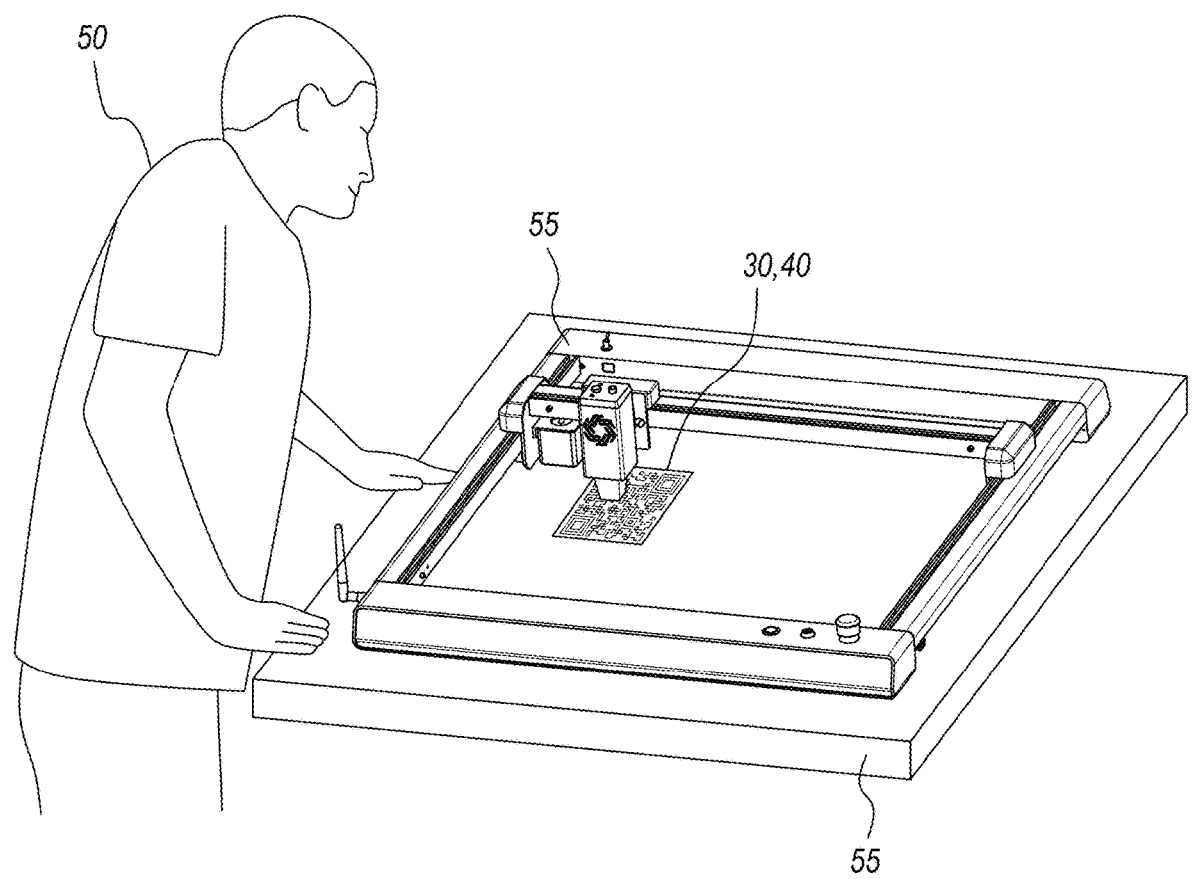
FIG. 4 is a depiction of the first person engraving or machining a special engraved plaque with an engraving device or machinery.

The first person 50 then engraves the unique scanning code 40 into a sheet of rigid planar material with an inner surface, an outer surface, and a middle section, wherein the engraving includes the carving, cutting, machining, or chiseling into the outer surface of the sheet of rigid planar material. The first person 50 uses an engraving device or machinery 55 to engrave the unique scanning code 40, as depicted in FIG. 4. Engraving must be used, as opposed to just mere surface treatment, like painting or printing, in order for the unique scanning code 40 on the rigid planar sheet of material to withstand the test of time and last for 50-100 years or more. This is also the reason why granite tombstones are engraved, rather than just mere surface treatment, in order for the engravings on the tombstone 20 to last for 50-100 years or more. Therefore, the unique scanning code 40 on the rigid planar sheet of material must also be engraved for longevity. The engraving penetrates the outer surface and reaches the middle section of the sheet of rigid planar material. In best mode, the middle section of the sheet of rigid planar material has a different color than that of the outer surface sheet of rigid planar material, thereby causing the engraved areas to have a strikingly different color than that none-engraved areas. Thus, the engravings become very conspicuous and easy to see. Alternately, the engraved areas could be filled with a paint or coloring that is a different color than the color of the outside surface of the sheet of rigid planar material, thereby causing the engravings to become very conspicuous and easy to see. The sheet of rigid material with the unique scanning code 40 engraved therein is called a plaque 30. The sheet of rigid material may be made of any known substance including: plastic, composite, metal, steel, glass, rubber, ceramic, acrylic, wood, marble, granite, brick, clay, or concrete.

Figure 1B:
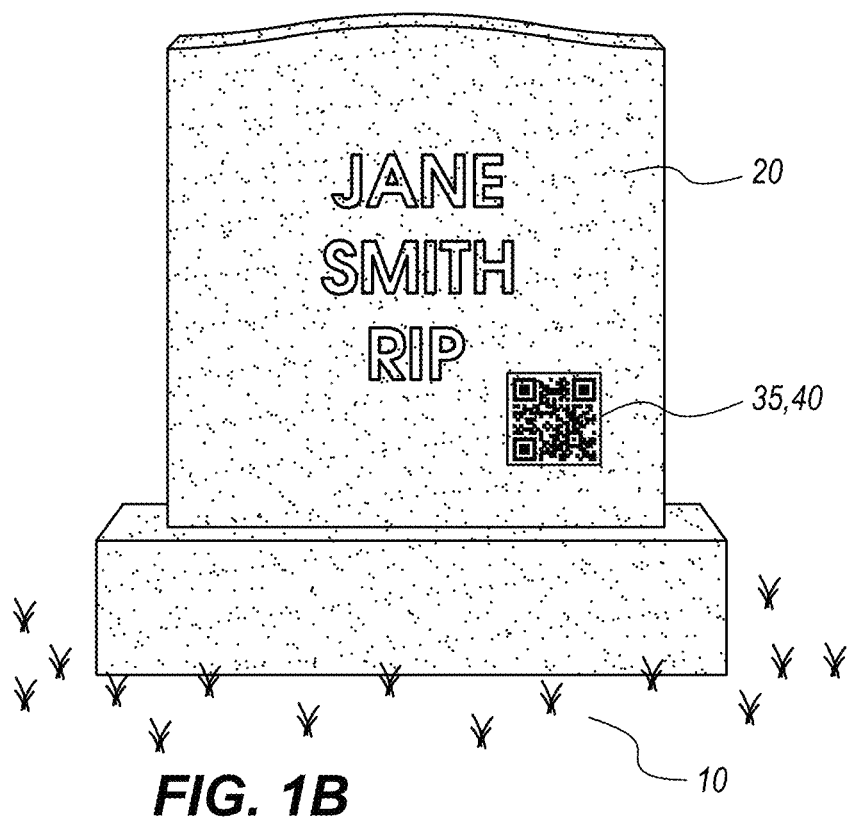
FIG. 1B is perspective view of the final resting place for a deceased person or pet with a tombstone with a special engraved plaque directly engraved into the tombstone.
Figure 2:
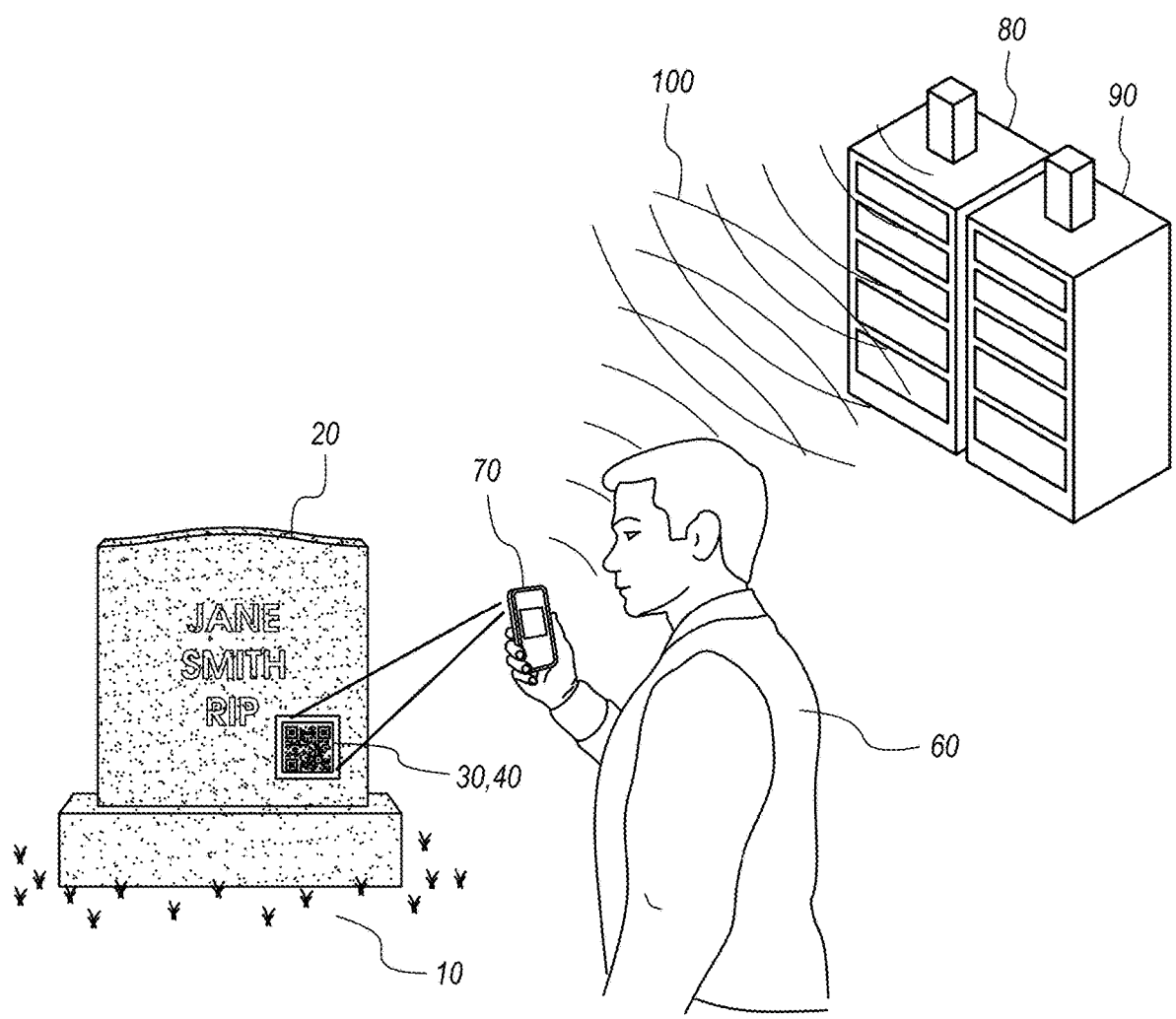
FIG. 2 is a perspective view of the final resting place for a deceased person or pet where a third person is scanning the special engraved plaque with their smart phone which is causing the smart phone to wirelessly communicate with a server and/or a database over a cellular network.
Figure 3:
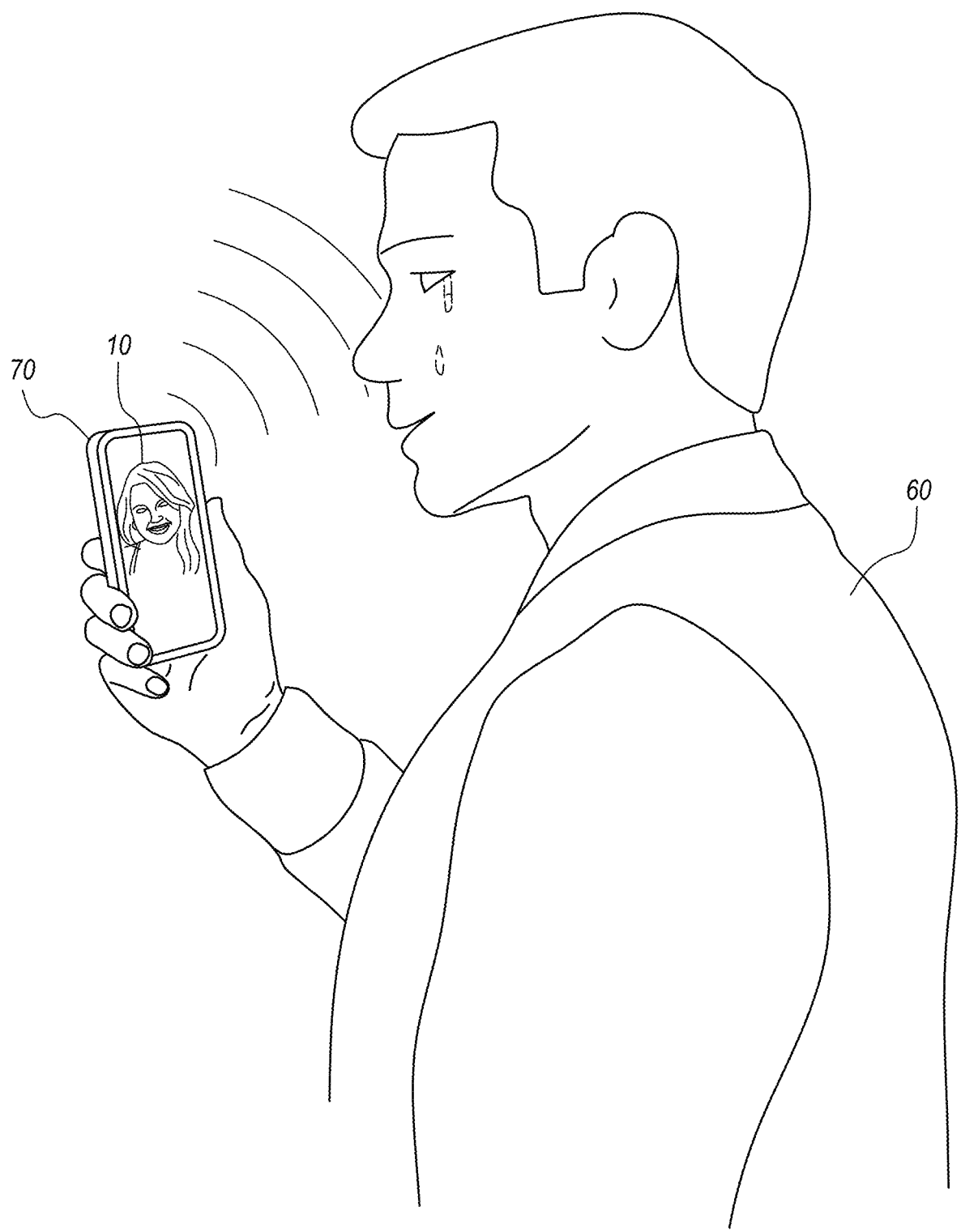
FIG. 3 is a depiction of the third person watching a plurality of media files related to the deceased person or pet and experiencing emotion.

Then, the first person 50 attaches the plaque 30 to a tombstone, urn, mausoleum, or crypt 20 associated with the deceased person or pet 10 as depicted in FIG. 1A. The tombstone, urn, mausoleum, or crypt 20 was created by others and installed near the deceased person's or pet's 10 remains in the usual manner. Attachment may be accomplished by any known means such as: weld, solder, glue, epoxy, adhesive, bolts, screws, rivets, clips, snaps, pins, or fasteners. Attachment may also be accomplished by attaching the plaque 30 to a chain and then attaching the chain to the tombstone, urn, mausoleum, or crypt 20 associated with the deceased person or pet 10. Alternately, the first person 50 could engrave the unique scanning code 40 directly into a tombstone, urn, mausoleum, or crypt 20 as depicted in FIG. 1B, which depicts a directly engraved plaque 35.

Then a third person 60 visits the deceased person or pet 10 while in possession of a smart phone or smart device 70s that is equipped with a camera function and a camera lens. The third person 60 opens the camera function on their smart phone or smart device 70 and points the camera lens on the smart phone or smart device 70 toward the plaque 30. The third person 60 holds the camera lens on the smart phone or smart device 70 pointed toward the plaque 30 for a few seconds. This causes the smart phone or smart device 70 to open a web browser and send the web browser to the pre-programmed website or URL that is embedded within the QR code. This process is called scanning the plaque 30. The scanning of the unique scanning code 40 on the plaque 30 redirects the smart phone or smart device 70 to a specific URL associated with the server 90, through network communications over a cellular network 100, wherein the server 90 then initiates the playback of the plurality of media files associated with the deceased person or pet 10 on the smart phone or smart device 70. This playback of media files on the smart phone or smart device 70 is known as streaming. The third person 60 watches and listens to the playback of the plurality of media files associated with the deceased person or pet 10 on the smart phone or smart device 70. The third person 60 then becomes emotional by laughing and/or crying upon the viewing and listening to the playback of the plurality of media files associated with the deceased person or pet 10 on the smart phone or smart device 70. The third person 60 may then contact the second person to discuss their emotions upon viewing and listening to the playback of the plurality of media files associated with the deceased person or pet 10 on the smart phone or smart device 70. The third person 60 may then contact the second person to tell them they really enjoyed watching the plurality of media files on their smart phone or smart device 70. The third person 60 may then contact the second person to offer their own media files pertaining to the deceased 10 to be loaded onto the server 90, in which case, the second person may then upload the third person's media files to the new record in the database 80 or instruct the first person 50 to upload the third person's media files to the new record in the database 80.

The above described process may continue into perpetuity as new people 60 visit different deceased 10, scan the unique scanning code 40 with their smart phone or smart device 70, and then watch the media playback.

Again, the second person has purchased a subscription or a one-time purchase from the first person 50 in order for the first person 50 to create the record in the database 80 and complete the whole set-up process including the engraving. In the event that the second person discontinues payment for the subscription to the first person 50, then the first person 50 would disconnect the playback service from operating by turning off the playback process in the database 80.

What is claimed is:

1. A media playback process initiated from an engraved plaque on a tombstone, urn, mausoleum, or crypt, said process comprising the steps of:

a first person creating a database with a database management system, said first person loading said database onto a server, said database comprises: a plurality of records, wherein each said record corresponds to a deceased person or pet, said database is capable of storing a plurality of media files, said first person selling a subscription service or one-time purchase to a second person, said first person creating or assigning a new record in said database to said deceased person or pet, said second person having internet access to said new record that includes the capability to upload one or more media files pertaining to said deceased person or pet to said new record in said database, said first person having internet access to said new record that includes the capability to upload one or more media files pertaining to said deceased person or pet to said new record in said database, said first person or said second person uploading a plurality of media files associated with said deceased person or pet to said new record in said database, said first person creating a unique scanning code that is associated with said new record on said database, said first person assigning said unique scanning code to said new record, said first person engraving said unique scanning code into a sheet of rigid planar material with an inner surface, an outer surface, and a middle section, said engraving penetrating said outer surface and reaching said middle section of said sheet of rigid planar material, said middle section of said sheet of rigid planar material having a different color than that of said outer surface sheet of rigid planar material, said unique scanning code engraved into said sheet of rigid planar material being known as a plaque, said first person attaching said plaque to a tombstone, urn, mausoleum, or crypt associated with said deceased person or pet, a third person visiting said deceased person or pet while in possession of a smart phone or smart devices that is equipped with a camera function and a camera lens, said third person opening said camera function on said smart phone or smart device and pointing said camera lens toward said plaque, said third person holding said camera lens pointed toward said plaque for 1-5 seconds, said smart phone or smart device opening a web browser and sending said web browser to a website or URL that is encoded within said unique scanning code, said server streaming said plurality of media files to said smart phone or smart device, said smart phone or smart device playing said plurality of media files, said third person watching and listening to said plurality of media files, and said third person contacting said second person and communicating to said second person that said third person watched and listened to said plurality of media files.

2. A media playback process initiated from an engraved plaque on a tombstone, urn, mausoleum, or crypt, said process comprising the steps of:

a first person creating a database with a database management system, said first person loading said database onto a server, said database comprises: a plurality of records, wherein each said record corresponds to a deceased person or pet, said database is capable of storing a plurality of media files, said first person selling a subscription service or one-time purchase to a second person, said first person creating or assigning a new record in said database to said deceased person or pet, said second person having internet access to said new record that includes the capability to upload one or more media files pertaining to said deceased person or pet to said new record in said database, said first person having internet access to said new record that includes the capability to upload one or more media files pertaining to said deceased person or pet to said new record in said database, said first person or said second person uploading a plurality of media files associated with said deceased person or pet to said new record in said database, said first person creating a unique scanning code that is associated with said new record on said database, said first person assigning said unique scanning code to said new record, said first person engraving said unique scanning code into a sheet of rigid planar material with an inner surface, an outer surface, an outer surface color, and a middle section, said engraving penetrating said outer surface and reaching said middle section of said sheet of rigid planar material and creating exposed middle section areas, said exposed middle section areas being painted with paint of a different color than said outer surface color, said unique scanning code engraved into said sheet of rigid planar material being known as a plaque, said first person attaching said plaque to a tombstone, urn, mausoleum, or crypt associated with said deceased person or pet, a third person visiting said deceased person or pet while in possession of a smart phone or smart devices that is equipped with a camera function and a camera lens, said third person opening said camera function on said smart phone or smart device and pointing said camera lens toward said plaque, said third person holding said camera lens pointed toward said plaque for 1-5 seconds, said smart phone or smart device opening a web browser and sending said web browser to a website or URL that is encoded within said unique scanning code, said server streaming said plurality of media files to said smart phone or smart device, said smart phone or smart device playing said plurality of media files, said third person watching and listening to said plurality of media files, and said third person contacting said second person and communicating to said second person that said third person watched and listened to said plurality of media files.

3. A media playback process initiated from an engraved plaque on a tombstone, urn, mausoleum, or crypt, said process comprising the steps of:

a first person creating a database with a database management system, said first person loading said database onto a server, said database comprises: a plurality of records, wherein each said record corresponds to a deceased person or pet, said database is capable of storing a plurality of media files, said first person selling a subscription service or one-time purchase to a second person, said first person creating or assigning a new record in said database to said deceased person or pet, said second person having internet access to said new record that includes the capability to upload one or more media files pertaining to said deceased person or pet to said new record in said database, said first person having internet access to said new record that includes the capability to upload one or more media files pertaining to said deceased person or pet to said new record in said database, said first person or said second person uploading a plurality of media files associated with said deceased person or pet to said new record in said database, said first person creating a unique scanning code that is associated with said new record on said database, said first person assigning said unique scanning code to said new record, said first person engraving said unique scanning code into a tombstone, urn, mausoleum, or crypt associated with said deceased person or pet, said engraving penetrating an outer surface of said a tombstone, urn, mausoleum, or crypt associated with said deceased person or pet, a third person visiting said deceased person or pet while in possession of a smart phone or smart devices that is equipped with a camera function and a camera lens, said third person opening said camera function on said smart phone or smart device and pointing said camera lens toward said unique scanning code, said third person holding said camera lens pointed toward said unique scanning code for 1-5 seconds, said smart phone or smart device opening a web browser and sending said web browser to a website or URL that is encoded within said unique scanning code, said server streaming said plurality of media files to said smart phone or smart device, said smart phone or smart device playing said plurality of media files, said third person watching and listening to said plurality of media files, and said third person contacting said second person and communicating to said second person that said third person watched and listened to said plurality of media files.

* * * * *